March 5, 1963 D. CHARLES Re. 25,343
ELECTRON GUN FOR TRAVELING-WAVE TUBES WITH
A TRANSVERSE MAGNETIC FIELD
Original Filed March 18, 1950
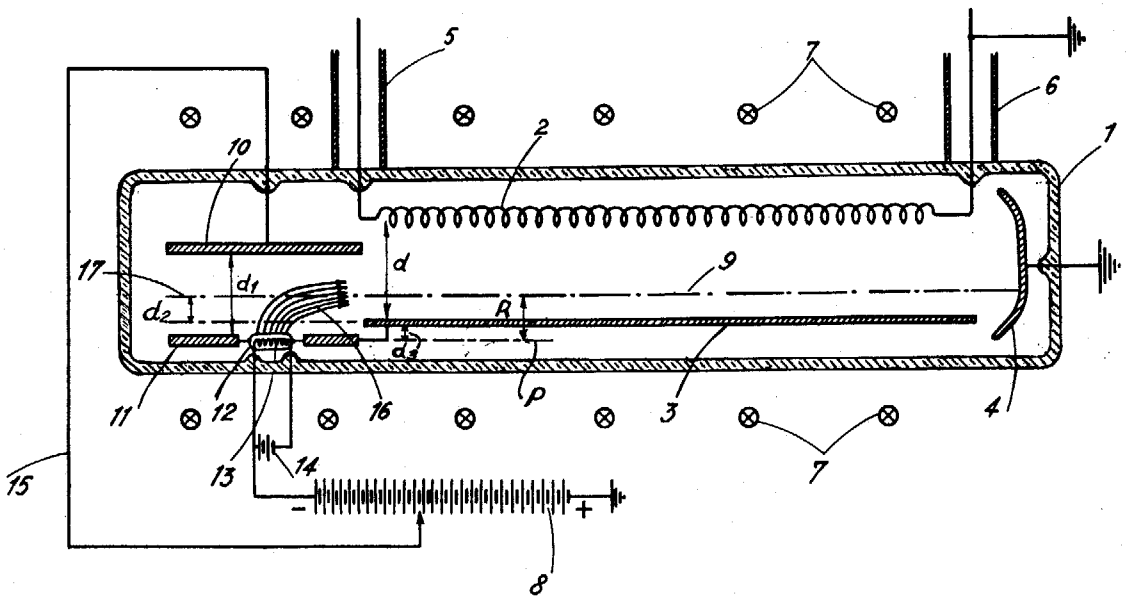
INVENTOR
DANIEL CHARLES
By: Hamilton, Lake & Co.
AGENTS United States Patent Office Re. 25,343
Reissued Mar. 5, 1963

25,343

ELECTRON GUN FOR TRAVELING-WAVE TUBES WITH A TRANSVERSE MAGNETIC FIELD

Daniel Charles, Paris, France, assignor to Compagnie Generale de Telegraphie Sans Fil, a corporation of France Original No. 2,694,783, dated Nov. 16, 1954, Ser. No. 150,357, Mar. 18, 1950. Application for reissue Jan. 10, 1961, Ser. No. 81,904
Claims priority, application France Mar. 21, 1949
5 Claims. (Cl. 315—3.5)

Matter enclosed in heavy brackets [ ] appears in the original patent but forms no part of this reissue specification; matter printed in italics indicates the additions made by reissue.

The present invention relates to travelling wave tubes, and more particularly to a novel electron gun for use in those tubes.

In the United States Patent No. 2,511,407 issued June 13, 1950, a travelling-wave tube is described wherein a retardation line comprising two parallel conductors is curved to circular form and an electric field is applied between its two conductors, while a magnetic field of suitable value and direction is applied at right angles both to said electron beam introduced into the electron and wave interaction space between said two conductors and propagating in a circle parallel to the retardation line. In the co-pending United States patent application, Serial No. 102,896, filed on July 2, 1949, by R. Warnecke et al., a similar arrangement is applied to a system in which the retardation line and the trajectory of the electron beam are not circular but straight. In either case a cathode for generating the electron beam is placed either at the level of the negative electrode of the retardation line, or in the interaction space between the two conductors, said cathode being raised to a suitable intermediate potential. However, no arrangement is made to ensure that the electrons, once they have left the cathode and taking into account the presence of the necessary fields for the operation of the system, follow a suitable trajectory as regards position in the system in keeping with the velocity which is imparted to the electrons.

My invention relates to a solution of this problem and provides a source of electrons adapted to generate a beam which is suitable for the correct operation of the tube of the type described.

According to the invention, I provide in the tube, before the input end of the retardation line, an electron gun comprising an auxiliary focusing system of two electrodes between which an electric field is set up which is parallel to the field between the conductors of the retardation line and the value of which is equal to half that of the latter field. I position the emitting cathode of the gun in relation to this auxiliary system at such a level that the electrons penetrate into the interaction space between the conductors of the retardation line at a desired velocity, approximately equal to the phase velocity of the electromagnetic wave which is excited in the conductors of the retardation line and which is to undergo an amplification in the tube by interacting with the electron beam. Furthermore, I make the position in space of the auxiliary system with respect to the conductors of the retardation line such that the imaginary equipotential surface along which the electrons leave the auxiliary system merges into the imaginary equipotential surface that corresponds to the desired velocity of the electrons in the field between the conductors of the retardation line.

The invention will be more clearly understood by considering the non-limitative embodiment thereof illustrated in the single figure of the accompanying drawing.

This figure shows an axial section, in the plane at right angles to the lines of magnetic field, of a travelling-wave tube described in the aforesaid patent and application, and more particularly of a tube of straight shape. It is, however, to be understood that everything stated in the ensuing description is also applicable to tubes of cylindrical shape, in which the distance between the conductors of the retardation line is small as compared with the radius of the cylinder, so that it may be considered that everything takes place as if the structure were flat.

The tube, which is contained in an envelope 1 of insulating material, comprises the usual elements of a travelling-wave tube with a transverse magnetic field, viz. a line comprising two conductors 2 and 3, the conductor 2 for example of which is a retardation line shown schematically in the form of a helix raised to a positive potential, while the conductor 3 is a flat negative electrode. A collector 4 is provided for collecting the electron beam, and the coaxial lines 5 and 6 respectively serve for exciting the line and for collecting the amplified energy. Magnetic poles not shown, located on either side of the tube, supply a magnetic field at right angles to the plane of the drawing, a few of the lines of force of which are shown at 7. If the electric field between the conductors 2 and 3 is directed upwards in the figure, and if the electrons are to move from left to right, the magnetic field must be directed from the observer towards the drawing. The electric field between the conductors of the line is set up by means of the source 8 that supplies the collector 4 and the retardation line 2 by means of its positive pole which is connected to ground.

By the combined action of the electric field and the transverse magnetic field, the electrons, under optimum conditions, describe in the space between the conductors 2 and 3 a trajectory at a mean velocity of the wave in the line. In order that said trajectory, in the absence of the radio-frequency field, may be a cycloid described along a line parallel to the retardation line, it is necessary for the electric field E and the magnetic field B to be related to each other by the equation $$v=\frac{E}{B} \qquad (1)$$

To this velocity there corresponds in the field an equipotential level or imaginary surface 9, the potential $V_0$ of which is determined by the kinetic energy equation:

$$\epsilon V_0=\frac{1}{2}mv^2 \qquad (2)$$

The conditions for stability require that the electrons be introduced into the field E at the velocity v precisely along the equipotential surface 9, in order that they may follow a mean straight path at the level of that surface.

On the other hand, the potential to be given to the retardation line is determined by the considerations of power efficiency which is substantially equal to the ratio between the difference of potentials through which the electrons pass laterally by the action of the radio-frequency field (difference of potentials between the conductor 2 and the equipotential surface 9), and the difference of potentials between the conductor 2 and the equipotential surface zero (the potential of the source of electrons being taken by convention as 0), i.e. the difference of potentials between the conductors 2 and 3 if the conductor 3 is at the potential of the cathode. In other words, if the potential of the conductor 2 is denoted by $nV_0$, the efficiency will be substantially equal to $$\frac{n-1}{n}$$

If a desired efficiency is given, I therefore have all the elements for determining the potential of the conductor 2, the electric field and the magnetic field to be applied to the system, and also for defining the position of the equipotential surface 9 in said system.

According to the invention, I provide before the entrance into the system of conductors 2 and 3, an auxiliary system of two beam focusing electrodes 10 and 11 which are formed for example by plates parallel to the axis of the system and to the magnetic field, and between which an electric field $$\frac{E}{2}$$

is set up (the field E being the field between the electrodes 2 and 3). The emitting cathode 12, which is heated by a filament 13 supplied from a source 14, is located for example at the level of the electrode 11 which is this case is connected to the potential of the cathode 12 assumed by definition to be 0. In order to obtained the desired field, it is only necessary to connect the electrode 10 by means of the connection 15 to an intermediate potential obtained from the source 8 that supplies the conductor 2. The conductor 3 is connected in the example described to the electrode 11, i.e. it is at the potential 0, without this arrangement being limitative, since said electrode may also be raised to a certain negative or positive potential provided that it is shifted transversely a suitable distance relatively to the equipotential surface 9.

In the arrangement shown, an electron that starts without initial velocity from the level of the cathode at the potential 0, describes, in the presence of a perpendicular magnetic field, a cycloid 16 at a velocity equal to:

$$V_1=\frac{2E_1}{B}$$

wherein $E_1$ is the electric field between the plates 10 and 11.

It can be seen that if $$E_1=\frac{E}{2}$$

the velocity $v_1=v$.

Owing to the fact that this velocity, which may be represented by a line tangent to the cycloid, is parallel to the axis of the system at the highest point of the trajectory 16, it can be seen that if said highest point is located directly at the outlet from the system 10—11 and at the inlet the system 2—3, I have obtained the object that my invention is intended to provide, viz. that the electrons penetrate into the space between the conductors of the retardation line at a velocity equal to the phase velocity of the wave to be amplified.

Furthermore, in order to obtain a smooth join without sudden variations of field, I shift the system 10—11 transversely with respect to the system 2—3 in such a manner that the equipotential surface 17, along which the electrons leave the system 10—11, is joined to the equipotential surface 9, the position of which in the system 2—3 was defined by the Equations 1 and 2 hereinbefore explained. Since the equipotential surface 9 corresponds to the potential $V_0$, the equipotential surface 17 corresponds to the axis of symmetry between 10 and 11, the potential to be given to the electrode 10 is $2V_0$, and the distance $d_1$ between 10 and 11 is defined by the condition $$d_1=\frac{2V_0}{\frac{E}{2}}=\frac{4V_0}{E}$$

Since, on the other hand, the distance d between 2 and 3 is given by $$d=\frac{nV_0}{E}$$

it can be seen that $d_1$ may be made equal to d, without this being limitative, provided that n=4, that is to say that an efficiency of 75 percent is chosen.

The invention is not restricted to the example described and does not depend in particular either on the nature of the cathode used, or on the shape of the system, or on the relative potentials and displacements which have been mentioned only in a non-limitative manner. The invention includes all the modifications which are accessible to the expert, using the general principle which comprises placing the emitting cathode of a tube of the type described in an auxiliary focusing system in which there is an electric field which is substantially less than the field required for the operation of the tube, said system being arranged relatively to the overall structure of the tube in such a manner that there is a gradual joining of the two fields. As shown in the drawing, this latter condition is obtained when the distance R between the equipotential surface in the interaction space and a parallel plane P passing through the cathode is equal to the algebraic sum of the distance $d_2$ between the conductor 3 and the equipotential surface of same potential value in the focusing space and the distance $d_3$ between the conductor 3 and the plane P.

I claim:

1. A crossed-field travelling wave tube of the type including a delay line, a base electrode parallel to said delay line and defining therewith an interaction space, means for providing in said *interaction* space an electric field and means for providing *in said interaction space* a magnetic field, said electric and magnetic fields being perpendicular to each other *to form crossed fields* and to the direction of said delay line and base electrode, whereby there is provided within said interaction space an equipotential [plane] *surface* corresponding to the mean velocity with which electrons, when fed into said space, propagate therein under the action of said crossed fields, said tube comprising: means comprising a cathode and two electron focusing electrodes parallel to said delay line and base electrode and defining a focusing space, means for providing in said focusing space a uniform electric field substantially less than the *electric* field in said interaction space, of same direction and parallel thereto, and for providing the same magnetic field therein as in said interaction space, said cathode being positioned to feed electrons into said focusing space in a direction perpendicular to said focusing electrodes and parallel to the direction of said *second-mentioned* electric field, the distance between the center of said cathode and the plane of entry of said electrons into said interaction space being substantially equal to half the chord of an arch of the cycloidal path of said electrons in said focusing space under the action of said fields, the distance between said equipotential [plane] *surface* and a parallel [plane] *surface* passing through said cathode being equal to the algebraic sum of the distance between said base electrode and the equipotential plane of same potential value in the focusing space and of the distance between said base electrode and said parallel plane, and said focusing electrodes being positioned for delivering said electrons into said interaction space as soon as they leave said focusing space.

2. In a travelling wave tube having a retardation line and a parallel spaced conductor defining an interaction space therebetween, terminal connections thereto for applying a potential difference therebetween *to provide an electrostatic field in said interaction space,* and means for establishing a magnetic field in the interaction space having its lines of force directed at right angles to [the] *said* electrostatic field and to the direction of the line, whereby there is provided within said interaction space an equipotential [plane] *surface* corresponding to the mean velocity with which electrons, when fed into said space, propagate therein under the action of said crossed fields, an electron gun comprising a pair of parallel spaced electrodes defining a focusing space therebetween communicating with the interaction space, terminal connections to said electrodes for applying a potential difference therebetween, an electron emissive cathode positioned to emit electrons into said focusing space and contained in said magnetic field, whereby the electrons emitted by said cathode are caused to follow a cycloidal trajectory starting from said cathode, the magnitude of the potential difference and the distance between said electrodes being such that the potential in said focusing space at the level of the highest point of said cycloidal path is equal to the potential in the interaction space at said level, said highest point being contained in a transverse plane common to said spaces and defining for the electrons an exit from said focusing space and an entry into the interaction space, and the distance between said level and a parallel plane passing through said cathode being substantially equal to the algebraic sum of the distance between said conductor and the corresponding equipotential [level] *surface* in said focusing space and of the distance between said conductor and said parallel plane.

*3. In a traveling-wave tube, the combination according to claim 2, wherein the potential difference between said pair of parallel spaced electrodes defining the focusing space is one half the electrostatic field in said interaction space.*

*4. In a traveling-wave tube, the combination according to claim 2, wherein said electron emissive cathode is at the same potential as one of said pair of parallel spaced electrodes.*

*5. In a traveling-wave tube, the combination according to claim 2, wherein the distance between said pair of parallel spaced electrodes is substantially equal to the distance between said retardation line and said conductor.*

References Cited in the file of this patent or the original patent

UNITED STATES PATENTS

| | | |
|---|---|---|
| 2,232,158 | Banks | Feb. 18, 1941 |
| 2,372,328 | Labin | Mar. 27, 1945 |
| 2,414,121 | Pierce | Jan. 14, 1947 |
| 2,511,407 | Kleen et al. | June 13, 1950 |
| 2,531,972 | Doehler et al. | Nov. 28, 1950 |
| 2,600,509 | Lerbs | June 17, 1952 |
| 2,607,904 | Lerbs | Aug. 19, 1952 |